US012789265B2

(12) United States Patent
Kuldell et al.

(10) Patent No.: US 12,789,265 B2

(45) Date of Patent: Nov. 10, 2026

(54) DRILLING APPARATUS

(71) Applicant: THE BOEING COMPANY, Arlington, VA (US)

(72) Inventors: Kip Ryan Kuldell, Glen Carbon, IL (US); Ryan Frank Mir, St. Charles, MO (US); John Edward Inman, Maryland Heights, MO (US); Russell C. DeVlieg, Woodinville, WA (US); Patrick Dunn, Everett, WA (US); Timothy Ray Jackson, Clarksburg, WV (US)

(73) Assignee: THE BOEING COMPANY, Arlington, VA (US)

( * ) Notice: Subject to any disclaimer, the term of this patent is extended or adjusted under 35 U.S.C. 154(b) by 574 days.

(21) Appl. No.: 18/154,656

(22) Filed: Jan. 13, 2023

(65) Prior Publication Data

US 2024/0238878 A1 Jul. 18, 2024

(51) Int. Cl.

*B23B 39/14* (2006.01)
*B23Q 11/00* (2006.01)
(Continued)

(52) U.S. Cl.

CPC .......... *B23B 39/14* (2013.01); *B23Q 11/0046* (2013.01); *B25J 11/0055* (2013.01); *F16C 33/6659* (2013.01); *B23B 2270/36* (2013.01)

(58) Field of Classification Search

CPC ..... B23B 39/14; B23B 2270/36; B23B 51/02; B23B 2270/32; B23B 2215/04;
(Continued)

(56) References Cited

U.S. PATENT DOCUMENTS 1,210,299 A * 12/1916 Fraser ...................... B25D 9/20 92/33
3,583,821 A * 6/1971 Shaub ................ B23Q 11/0816 408/72 R
(Continued)

FOREIGN PATENT DOCUMENTS

CN 106041955 A * 10/2016 .............. B23P 23/04
CN 112372659 A * 2/2021 .......... B25J 15/0019
(Continued)

OTHER PUBLICATIONS

European Search Report for application No. 23206918.7 dated May 23, 2024, pp. 1-17.
(Continued)

*Primary Examiner* — Robert F Long
(74) *Attorney, Agent, or Firm* — Moore IP Law

(57) ABSTRACT

A drilling apparatus includes an attachment box configured to couple to a machine tool. The drilling apparatus facilitates formation of a hole in a workpiece with workpiece structure that results in a large offset distance from a start location of the hole to the machine tool, restricted access to the start location, or both. The drilling apparatus includes a bearing housing coupled to the attachment box. The bearing housing includes a pair of bearings. The drilling apparatus includes a shaft position through the bearing housing to couple to the bearings. The shaft includes an end effector interface configured to couple to one or more end effectors of the machine tool at a first end of the shaft. The shaft includes a tool interface configured to couple to a tool at a second end of the shaft. The drilling apparatus also includes an offset foot coupled to the bearing housing.

21 Claims, 6 Drawing Sheets

(51) Int. Cl.
*B25J 11/00* (2006.01)
*F16C 33/66* (2006.01)

(58) Field of Classification Search
CPC .............. B23B 2260/128; B23B 35/00; B23Q 11/0046; B25J 11/0055; B25J 11/005; B25J 19/063; F16C 33/6659
USPC ............................... 408/1, 8–15, 67, 76, 145
See application file for complete search history.

(56) References Cited

U.S. PATENT DOCUMENTS 3,897,602 A * 8/1975 Waterbury .............. B08B 9/045 15/104.33
3,907,452 A * 9/1975 Tripp .................... B23B 47/281 408/72 R
3,958,893 A * 5/1976 Boyajian .............. B25H 1/0078 408/112
4,131,166 A * 12/1978 Schnell ................... E02D 27/52 405/232
4,242,017 A * 12/1980 De Fazio ................ B23B 49/02 901/41
4,345,480 A * 8/1982 Basham .................. G01F 1/115 73/861.94
4,487,271 A * 12/1984 Pomeroy ............. B27B 17/0016 144/35.2
4,693,335 A * 9/1987 Almon ................... G01V 1/201 73/152.58
4,754,642 A * 7/1988 Miyairi ................... E21B 47/10 73/152.35
4,830,549 A * 5/1989 Neumaier ............ B25D 17/088 173/104
4,877,138 A * 10/1989 Motiwala .................. B07C 5/06 209/601
4,901,587 A * 2/1990 Deremo ............. B23Q 17/0966 73/11.01
5,022,800 A * 6/1991 Vindez ................... B23Q 5/402 173/19
5,058,781 A * 10/1991 Aronie ................ B05C 17/0103 222/326
5,273,124 A * 12/1993 Lloyd ..................... E21B 3/022 175/122
5,374,143 A * 12/1994 Deremo ............... B23Q 16/003 408/130
5,375,664 A * 12/1994 McDowell ................ E02D 7/18 173/147
5,396,964 A * 3/1995 Shellhorn ............... E21B 3/045 175/162
5,472,298 A * 12/1995 Mihai ................... B23B 31/005 408/8
5,477,596 A * 12/1995 Schlosstein ............ B23Q 3/186 29/33 K
5,586,605 A * 12/1996 Paterson ................... B25F 3/00 173/4
5,598,893 A * 2/1997 Carlson ................. E04H 17/263 173/217
5,813,298 A * 9/1998 Beattie .................. B25B 23/141 81/475
5,820,312 A * 10/1998 Stock ................... B25D 17/005 173/205
5,848,859 A * 12/1998 Clark ................... G05B 19/404 901/41
6,012,877 A * 1/2000 McCowin ............... B23B 49/02 901/41
6,315,059 B1 * 11/2001 Geldean .................. E21B 7/028 173/147
6,626,254 B1 9/2003 Krueger et al.
6,672,900 B2 * 1/2004 France ............... H01R 13/6273 439/589
6,715,563 B2 * 4/2004 Hubbard ................... E21B 7/24 173/184
7,121,357 B1 * 10/2006 Raimondi .............. B25D 17/02 173/90
7,165,630 B2 * 1/2007 Arnston ................. B23Q 17/22 173/32
7,264,426 B2 * 9/2007 Buttrick, Jr. ........... B23Q 5/385 408/1 R
7,458,421 B2 * 12/2008 Barrow ................... E21B 47/04 166/66
7,575,069 B2 * 8/2009 Pavlik ..................... E21B 7/027 175/323
7,980,796 B1 * 7/2011 Salt ........................... B64F 5/10 410/43
8,357,174 B2 * 1/2013 Roth ................ A61B 17/07207 227/175.1
8,425,162 B2 * 4/2013 Schevers ................ B23Q 5/225 408/100
8,438,715 B1 * 5/2013 Cronin .................. B23P 19/084 29/451
8,794,963 B2 * 8/2014 Lancieux ............... A61C 1/084 433/75
9,903,167 B2 * 2/2018 Dewald ................... E21B 19/07
10,077,893 B1 * 9/2018 Abraham ............ E04H 12/2223
11,003,160 B1 5/2021 Smiddy
11,534,921 B2 * 12/2022 Barnes ....................... B25J 9/12
11,542,998 B2 * 1/2023 Newth ....................... F16F 7/00
11,851,122 B2 * 12/2023 Sahakian .............. B23P 19/006
11,865,654 B2 * 1/2024 Lombard ................ E04C 2/043
12,208,453 B2 * 1/2025 Irvine ..................... B23B 35/00
2001/0041099 A1 * 11/2001 Kato ......................... E02D 7/20 405/257
2002/0144541 A1 * 10/2002 Molz, III ........... G01N 15/0826 73/38
2004/0191015 A1 * 9/2004 Kozak ................. B23B 51/0473 408/67
2005/0034881 A1 * 2/2005 Berger .................... F16N 29/02 173/171
2005/0232714 A1 * 10/2005 Ferrari ............... B23Q 17/2233 408/97
2006/0159533 A1 7/2006 Zeiler et al.
2008/0044236 A1 * 2/2008 Lloyd ....................... E02D 7/16 173/39
2008/0124181 A1 5/2008 Hintze et al.
2008/0286059 A1 11/2008 Bruerton
2008/0289839 A1 * 11/2008 Hricko ................ B25B 23/0064 173/4
2008/0302549 A1 * 12/2008 Zeiler ................ B23Q 17/0985 408/239 R
2009/0145520 A1 * 6/2009 Opsitos, Jr. ............. B23B 45/02 144/365
2009/0210294 A1 * 8/2009 Sakamoto ............ F04B 49/065 417/63
2010/0092247 A1 * 4/2010 Hecht ....................... E02D 5/22 405/231
2011/0139475 A1 * 6/2011 Braun .................... B25D 17/26 173/112
2012/0020756 A1 1/2012 Zagar
2012/0308320 A1 * 12/2012 Tseng ................. B23Q 11/0053 408/67
2013/0004254 A1 * 1/2013 Lange ................... B23B 51/102 408/1 R
2013/0296886 A1 * 11/2013 Green .................... A61B 34/70 606/130
2014/0165368 A1 * 6/2014 Cordova ................ H02G 3/121 411/102
2015/0219257 A1 * 8/2015 Harper .................... F16L 25/00 173/168
2016/0271781 A1 * 9/2016 Kobayashi .............. F16H 25/20
2016/0348332 A1 * 12/2016 Talbert ...................... E02D 7/22
2017/0021488 A1 * 1/2017 Gerber ...................... B25F 3/00
2017/0232618 A1 * 8/2017 Pidan ..................... G05B 19/19 700/164
2018/0036852 A1 * 2/2018 Padget ............... B23Q 11/0071
2018/0178366 A1 * 6/2018 Matei ...................... B25B 21/00
2018/0326507 A1 * 11/2018 Halvorsen .............. B25J 9/1679
2019/0193170 A1 6/2019 Monroe
2020/0200007 A1 * 6/2020 Gotmalm .................. G01L 1/04
2020/0392745 A1 * 12/2020 McKenna ................. E04G 1/15
2021/0072052 A1 * 3/2021 Molinazzi ............... G01F 15/00
2021/0245353 A1 * 8/2021 Crowell .................... B25F 5/00

(56) References Cited

U.S. PATENT DOCUMENTS

| | | | | |
|---|---|---|---|---|
| 2021/0370456 | A1* | 12/2021 | Sonntag | B23Q 11/0046 |
| 2021/0393096 | A1* | 12/2021 | Maier | A47L 9/242 |
| 2022/0193874 | A1* | 6/2022 | Ramezanian | B25F 5/006 |
| 2022/0219249 | A1* | 7/2022 | Gisselman | B25F 5/00 |
| 2024/0033890 | A1* | 2/2024 | Kaye, Jr. | B25B 27/10 |
| 2024/0238878 | A1* | 7/2024 | Kuldell | F16C 33/6659 |
| 2024/0246215 | A1* | 7/2024 | Burnett | B25F 3/00 |
| 2025/0231073 | A1* | 7/2025 | Ellsworth | G01L 5/0061 |

FOREIGN PATENT DOCUMENTS

| | | | | | |
|---|---|---|---|---|---|
| CN | 114192840 | A | * | 3/2022 | B25F 5/00 |
| DE | 20008356 | U1 | | 8/2000 | |
| EP | 3275579 | A1 | * | 1/2018 | B23B 47/00 |
| EP | 4400238 | A2 | * | 7/2024 | B25J 11/005 |
| JP | 7232581 | B2 | * | 3/2023 | B25J 9/1015 |
| WO | 2016174443 | A1 | | 11/2016 | |
| WO | WO-2021047777 | A1 | * | 3/2021 | B23Q 17/2233 |

OTHER PUBLICATIONS

Extended European Search Report for application No. 23206918.7 dated Sep. 11, 2024, pp. 1-17.

* cited by examiner

DRILLING APPARATUS

FIELD OF THE DISCLOSURE

The present disclosure is related to a drilling apparatus and methods of use of the drilling apparatus. The drilling apparatus enables formation of a close tolerance hole at a location of a structure with limited access, a large offset distance from a drive mechanism for the drilling apparatus to a start location for the hole, or both.

BACKGROUND

Machine tools are used during the manufacture of products. Some machine tools include a movable platform and a tool arm (e.g., a robot). Various tools can be attached to end effectors on the tool arm to perform particular tasks.

During manufacture of some products (e.g., aircraft), holes need to be formed in workpieces at very precise locations and with very close tolerances. Close tolerance holes in relatively small workpieces that are easily moved are often formed using a drill press. For larger workpieces, a drill jig can be used to facilitate formation of close tolerance holes. For some workpieces, a location of the hole and a shape of the workpiece make the use of drill jigs labor intensive, time consuming, and unreliable to consistently produce holes within a tolerance limit due to deflection during drilling.

SUMMARY

According to one implementation of the present disclosure, a drilling apparatus includes an attachment box configured to couple to a machine tool. The drilling apparatus is configured to facilitate formation of a hole in a workpiece with workpiece structure that results in a large offset distance from a start location of the hole to the machine tool, restricted access to the start location of the hole, or both. The drilling apparatus includes a bearing housing coupled to the attachment box. The bearing housing includes a pair of bearings. The drilling apparatus includes a shaft position through the bearing housing to couple to the bearings of the bearing housing. The shaft includes an end effector interface configured to couple to one or more end effectors of the machine tool at a first end of the shaft. The shaft includes a tool interface configured to couple to a tool at a second end of the shaft. The drilling apparatus also includes an offset foot coupled to the bearing housing.

According to another implementation of the present disclosure, a drilling system includes an attachment box to couple to an end effector of a machine tool. The drilling system is configured to facilitate formation of a hole in a workpiece with workpiece structure that results in a large offset distance from a start location of the hole to the end effector of the machine tool, restricted access to the start location of the hole, or both. The drilling system includes a bearing housing coupled to the attachment box. The bearing housing includes a pair of bearings. The drilling system includes a shaft positioned through the bearing housing to couple to the bearings of the bearing housing. The shaft is configured to couple to a spindle of the machine tool at a first end. The drilling system includes a drill bit configured to couple to a second end of the shaft. The drilling system also includes an offset foot coupled to the bearing housing. The offset foot includes a tip configured to contact the workpiece during use.

According to another implementation of the present disclosure, a drilling system includes a machine tool. The machine tool includes a spindle. The drilling system is configured to facilitate formation of a hole in a workpiece with workpiece structure that results in a large offset distance from the machine tool to a start location of the hole, restricted access to the start location of the hole, or both. The drilling system includes an attachment box configured to couple to the machine tool. The drilling system includes a bearing housing coupled to the attachment box. The bearing housing includes a pair of bearings. The drilling system includes a shaft positioned through the bearing housing. The shaft is configured to couple to a drill mechanism of the machine tool at a first end of the shaft. The drilling system includes a drill bit configured to couple to a second end of the shaft. The drilling system also includes an offset foot coupled to the bearing housing. The offset foot includes a contact tip configured to contact the workpiece during use.

The features, functions, and advantages that have been described can be achieved independently in various implementations or may be combined in yet other implementations, further details of which are disclosed with reference to the following description and drawings. The drawings are conceptual and not drawn to scale.

DETAILED DESCRIPTION

Figure 1:
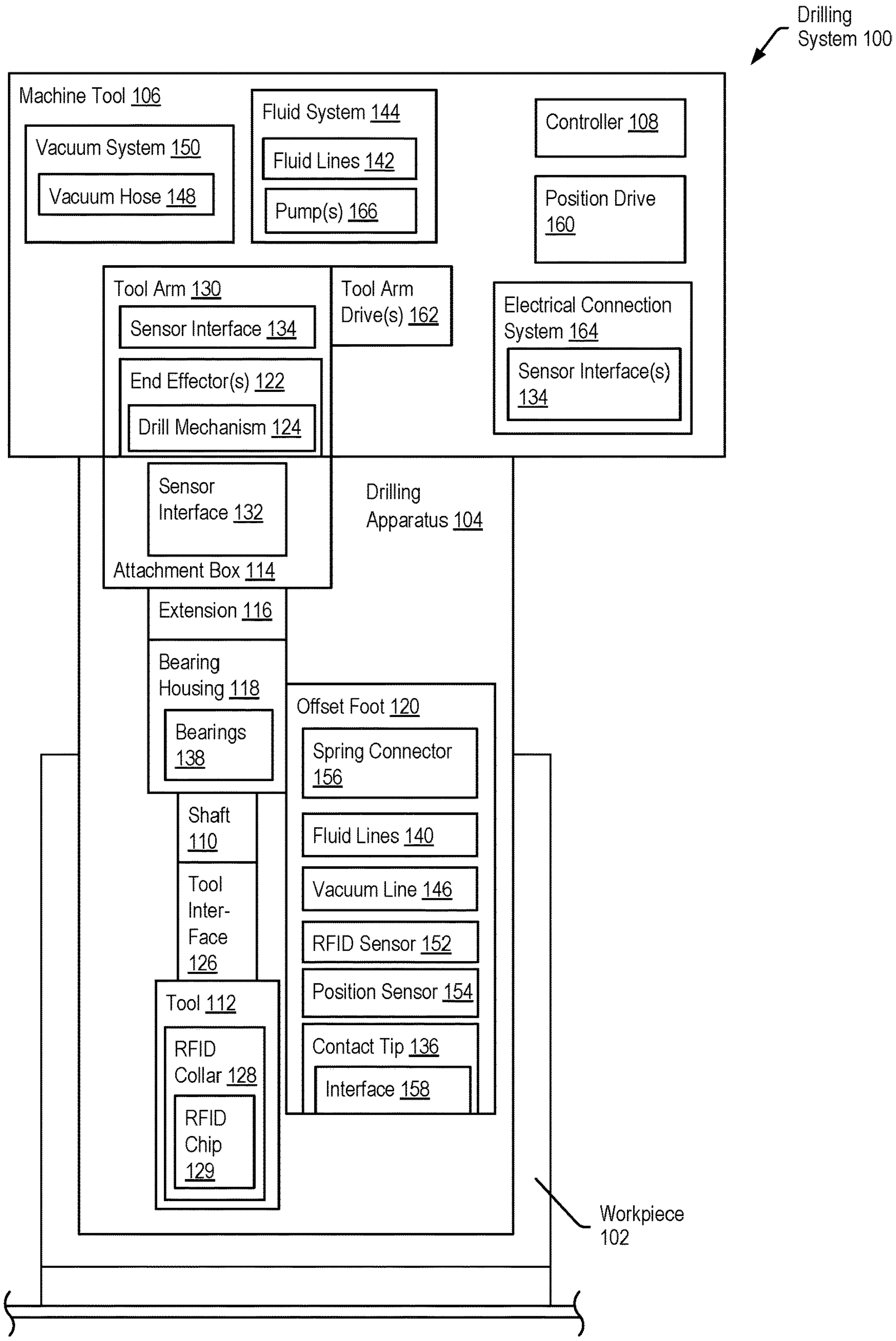
FIG. 1 is a block diagram of a drilling system.

A drilling system enables a close tolerance hole to be drilled in a workpiece. The drilling system includes a machine tool that positions a drilling apparatus and utilizes the drilling apparatus to facilitate formation of the hole. The workpiece may include structure that results in a large offset distance from an end effector interface that couples to the machine tool to the start location of the hole. The structure may also result in limited access to the start location of the hole. During a process to form a close tolerance hole, a plurality of tools can be coupled to a tool interface of the drilling apparatus at various times during the process. In an implementation of forming the close tolerance hole, the tools can include a touch probe to determine surface features associated with the workpiece near a start location for the hole to facilitate determination of the start location of the hole, a pen tool to mark the start location where the hole will be formed, and a drill bit used to form the hole. In other implementations, fewer tools or additional tools can be coupled to the tool interface during the process of forming the close tolerance hole.

The machine tool controls travel and a contact location of a contact tip of the drilling apparatus with the workpiece during the process of forming the close tolerance hole. An interface between the drilling apparatus and an effector of the machine tool that operates the drilling apparatus can be at a large offset distance from the location of the hole (e.g., 30 inches, 24 inches, or some other offset distance) to enable accommodation of workpiece structure near the location for the hole.

The machine tool can control movement of the drilling apparatus (e.g., lateral movement relative to the workpiece and movement towards or away from the workpiece) such that placement of the contact tip of the drilling apparatus is at a particular location on the workpiece. When the contact tip of the drilling apparatus is at the particular location, a body of the drilling apparatus can be close to, but not contacting, the structure of the workpiece. For example, a separation distance between a portion of the structure of the workpiece and a body of the drilling apparatus can be about a sixteenth of an inch or greater for a workpiece where the hole is to be formed at a location with limited access to the location of the hole.

The machine tool provides sufficient force to the drilling apparatus at the contact tip when the drilling apparatus is drilling the hole to counteract torque and drill thrust caused by interaction of the drill bit with the workpiece during formation of the hole and to consistently enable formation of holes that satisfy a tolerance threshold. A vacuum system of the machine tool coupled to the drilling apparatus removes cuttings during drilling. Also, a fluid system of the machine tool supplies fluid through fluid lines to the drilling apparatus to provide lubrication fluid to bearings of the drilling apparatus, to provide lubrication fluid as a mist to the drill bit to cool the drill bit and facilitate removal of cuttings by the vacuum system, or both.

One technical benefit of the disclosed drilling apparatus is that drilling apparatus enables consistent formation of close tolerance holes in workpieces. A workpiece can include structure that results in a large offset distance from a start location of the hole to an interface between the drilling apparatus and a machine tool that drives the drilling apparatus, restricted access to the start location of the hole, or both. The formation of a close tolerance hole in the workpiece using the drilling system is more reliable to satisfy a tolerance threshold, quicker, and less human labor intensive than forming the hole using a drill jig. The drilling apparatus may be relatively light weight (e.g., less than 30 pounds). The light weight of the drilling apparatus and the maneuverability of the tool arm of the machine tool enable a single person, or two people, to couple the drilling apparatus to the machine tool or uncouple the drilling apparatus from the machine tool.

Particular implementations are described herein with reference to the drawings. In the description, common features are designated by common reference numbers throughout the drawings. As used herein, various terminology is used for the purpose of describing particular implementations only and is not intended to be limiting. For example, the singular forms “a,” “an,” and “the” are intended to include the plural forms as well, unless the context clearly indicates otherwise. The terms “comprise,” “comprises,” and “comprising” are used interchangeably with “include,” “includes,” or “including.” Additionally, the term “wherein” is used interchangeably with the term “where.” As used herein, “exemplary” indicates an example, an implementation, and/or an aspect, and should not be construed as limiting or as indicating a preference or a preferred implementation. As used herein, an ordinal term (e.g., “first,” “second,” “third,” etc.) used to modify an element, such as a structure, a component, an operation, etc., does not by itself indicate any priority, order, or arrangement of the element with respect to another element, but rather merely distinguishes the element from another element having a same name (but for use of the ordinal term). As used herein, the term “set” refers to a grouping of one or more elements, and the term “plurality” refers to multiple elements.

As used herein, “generating,” “calculating,” “using,” “selecting,” “accessing,” and “determining” are interchangeable unless context indicates otherwise. For example, “generating,” “calculating,” or “determining” a parameter (or a signal) can refer to actively generating, calculating, or determining the parameter (or the signal) or can refer to using, selecting, or accessing the parameter (or signal) that is already generated, such as by another component or device. As used herein, “coupled” can include “communicatively coupled,” “electrically coupled,” or “physically coupled,” and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, “directly coupled” is used to describe two devices that are coupled (e.g., communicatively coupled, electrically coupled, or physically coupled) without intervening components.

FIG. 1 is a block diagram of a drilling system 100 to facilitate formation of a hole in a workpiece 102. The drilling system 100 includes a drilling apparatus 104 and a machine tool 106 configured to position and operate the drilling apparatus 104. In some implementations, the drilling apparatus 104 is used to perform several tasks associated with formation of the hole. For example, in particular implementations, the drilling apparatus 104 is used to determine surface features associated with the workpiece 102 near a location where the hole is to be formed, is used to mark a start location of the hole, is used to drill the hole, or combinations thereof. In other implementations, the drilling apparatus 104 is used to perform fewer tasks or additional tasks. Determined surface features associated with the workpiece 102 can include coordinate locations of features (e.g., holes, edges, slots, etc.) of the workpiece 102 or supports for the workpiece 102 (e.g., linkage systems) for a coordinate system used by the machine tool 106. The determined surface features are used by a controller 108 of the machine tool 106 to determine the start location of the hole. The start location may be at a particular surface feature or at an offset distance from one or more particular surface features.

In some usage implementations of the drilling system 100, the workpiece 102 does not include workpiece structure that inhibits access to a start location of a hole to be formed in the workpiece 102. In other usage implementations of the drilling system 100, the workpiece 102 includes structure that can restrict access to a start location of a hole (e.g., the workpiece structure of the workpiece 102 results in a large offset distance from a start location of a hole to an interface between the drilling apparatus 104 and the machine tool 106, limited access to the start location, or both).

Figure 2:
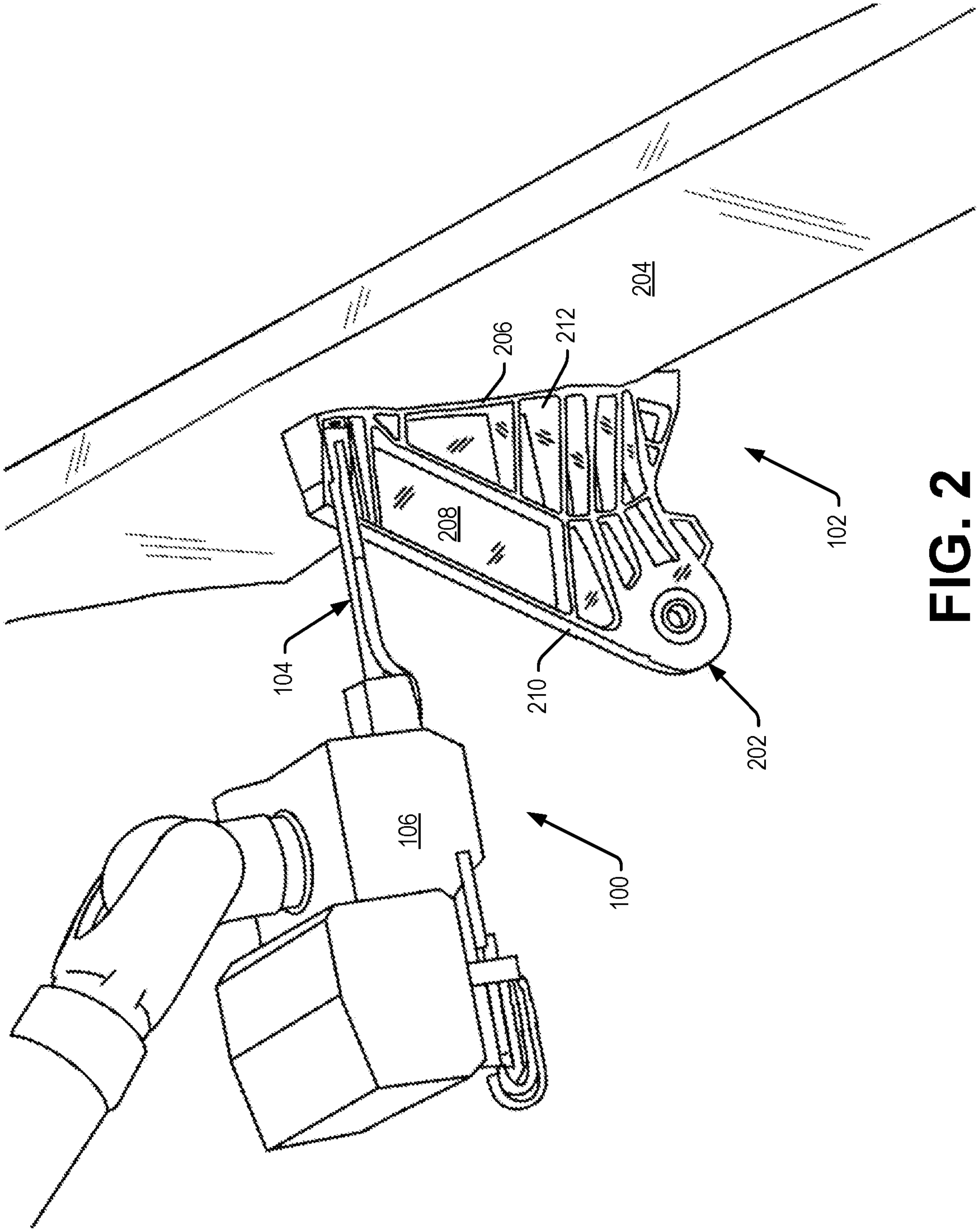
FIG. 2 is a perspective view of the drilling system of FIG. 1 in use to form a hole in a workpiece.

For example, during production of some types of aircraft, a carrier is attached to a flap of a wing to enable movement of the flap relative to other portions of the wing. FIG. 2 depicts a representation of a drilling system 100 during formation of a hole in a workpiece 102. The drilling system 100 includes the drilling apparatus 104 and the machine tool 106. The workpiece 102 includes a carrier 202 and a flap 204. The carrier 202 has a bottom flange 206 that contacts the flap 204 and a web 208 between the bottom flange 206 and a narrower top flange 210. A height from the bottom flange 206 to the top flange 210 varies up to a height of about 24 inches or more. Web supports 212 coupled to the web 208, the top flange 210, and the bottom flange 206 create recesses in the carrier. The height of the web 208 and limited accessibility to a location for the hole due to the web 208, the web supports 212, the top flange 210, the recesses, or combinations thereof, make securing the carrier 202 to the flap 204 difficult.

To secure the carrier 202 to the flap 204, the bottom flange 206 is coupled to the flap to form the workpiece 102 using one or more connecting devices (not shown). The connecting devices may include one or more clamps, one or more linkage systems, other devices, or combinations thereof. Using the drilling system 100, a number of holes (e.g., four holes) are drilled in recesses on a first side of the web 208 through the bottom flange 206, through skin of the flap 204, and into support structure (not shown) of the flap 204 and a number of holes (e.g., four holes) are drilled in recesses on a second side of the web 208 through the bottom flange 206, through the skin of the flap 204, and into the support structure of the flap 204. The holes are close tolerance holes that cannot have a diameter below a minimum hole diameter (e.g., 0.500 inches, 0.625 inches, 0.750 inches or some other diameter) and can only exceed the minimum diameter by a small amount (e.g., 0.003 inches or some other tolerance threshold). The drilling system 100 is moved to another location, connectors are positioned in each of the holes to secure the carrier 202 to the flap 204, and the one or more connecting devices are removed.

Figure 3:
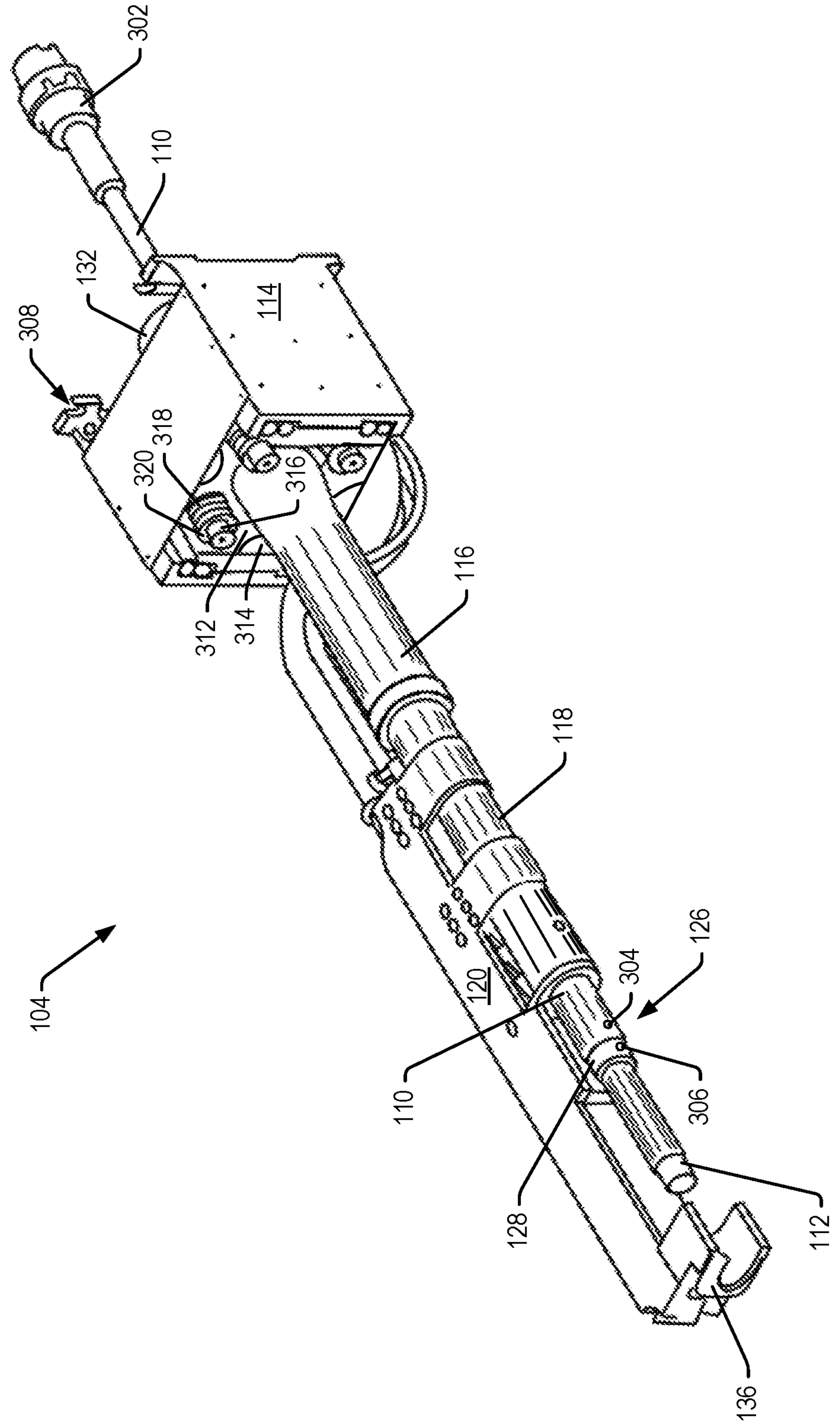
FIG. 3 is a perspective view of a drilling apparatus.

As depicted in FIG. 1 and in FIG. 3, the drilling apparatus 104 includes a shaft 110, a tool 112 coupled to the shaft 110, an attachment box 114, an extension tube 116, a bearing housing 118, and an offset foot 120. In other implementations, the drilling apparatus 104 may include fewer components or additional components. For example, in an implementation, the bearing housing 118 is directly coupled to the attachment box 114 without an extension 116 between the bearing housing 118 and the attachment box 114.

The shaft 110 extends through the attachment box 114, the extension tube 116, and the bearing housing 118. The shaft 110 includes an end effector interface 302 (as shown in FIG. 3) at a first end of the shaft 110. The end effector interface 302 enables the shaft 110 to be releasably coupled to a particular end effector of end effectors 122 of the machine tool 106 so that the drilling apparatus 104 is able to perform a particular task. For example, when the task for the drilling apparatus 104 is to drill a hole, the particular end effector is a drill mechanism 124, and the end effector interface 302 is coupled to a spindle of the drill mechanism 124 of the machine tool 106. In an implementation, the end effector interface 302 is an HSK 40 spindle interface. In other implementations, the end effector interface 302 is another type of interface.

The shaft 110 also includes a tool interface 126 at a second end of the shaft 110. In a particular implementation, the tool interface 126 includes a bore into the shaft 110 to receive an insertion portion of the tool 112, a set screw opening in a side of the shaft 110, and a first set screw 304 (e.g., as depicted in FIG. 3) positioned in the set screw opening to secure the insertion portion positioned in the bore to the shaft 110. In other implementations, other tool interface configurations are used.

The tool 112 is configured to perform one or more tasks. The tool 112 can be a touch probe to facilitate determination of a start location of a hole, a pen tool to mark a start location of the hole, a drill bit to form the hole, or another type of tool to perform one or more tasks.

The tool 112 is releasably coupled to the tool interface 126. Some tools 112 (e.g., drill bits) may include an RFID (radio frequency identifier) collar 128 that includes an RFID chip 129. The RFID chip 129 stores information that identifies a particular tool, properties associated with the particular tool, or both. When the particular tool is coupled to the shaft 110, the drilling apparatus 104 sends an identifier signal received from the RFID chip 129 of the particular tool to the controller 108 of the machine tool 106. The identifier signal includes data that identifies the particular tool 112, a number of times the particular tool 112 has been used, other information, or combinations thereof. Based on the data, the controller 108 determines whether the particular tool 112 can be used (e.g., the number of uses of the tool 112 does not exceed a threshold number of uses when the tool 112 is a drill bit). The identifier signal, or the lack of an identifier signal, enables the controller 108 to prevent inappropriate use of the tool 112 coupled to the tool interface 126 of the shaft 110. For example, when the controller 108 does not receive the identifier signal associated with the tool 112 (e.g., the tool 112 is a touch probe that does not include an RFID collar 128) coupled to the shaft 110, the controller 108 is not able to send control instructions that would cause the machine tool 106 to use the drill mechanism 124 to rotate the tool 112 as if the tool 112 was a drill bit because the identifier signal does not indicate that the tool 112 is a drill bit.

Figure 4:
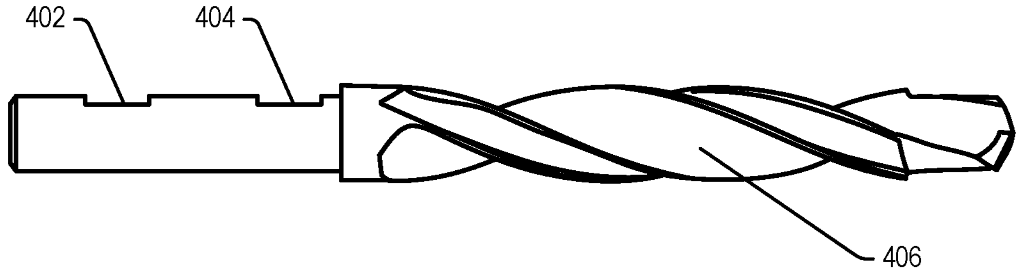
FIG. 4 is a side view of a tool usable by the drilling apparatus of FIG. 3.

In some implementations, the insertion portion of the tool 112 includes a first flat portion. An end of the first set screw 304 (shown in FIG. 3) of the tool interface 126 is driven against the first flat portion when the tool 112 is securely coupled to the shaft 110. The tool 112, the tool interface 126, or both, can include a visual marker to indicate a proper orientation of the tool 112 relative to the shaft 110 so that the first set screw 304 will contact the first flat portion when the first set screw 304 is driven against the tool insertion portion. In implementations where the tool 112 includes an RFID collar 128, in addition to the first flat portion that enables the tool to be securely coupled to the shaft 110, the insertion portion includes a second flat portion to enable a second set screw 306 (shown in FIG. 3) to secure the RFID collar 128 to the tool 112. FIG. 4 depicts an implementation of a portion of a tool 112 with a first flat portion 402 and a second flat portion 404. The tool 112 depicted in FIG. 4 is a drill bit 406.

Returning to FIG. 1, the attachment box 114 is configured to couple the drilling apparatus 104 to the machine tool 106. In some implementations, the attachment box 114 may include one or more sets of positioning slots 308 that are configured to be placed on corresponding mounts of an end effector support platform of the tool arm 130 of the machine tool 106 when the drilling apparatus 104 is coupled to the machine tool 106. In an implementation, the attachment box 114 includes a set of positioning slots 308 (shown in FIG. 3) to orient the drilling apparatus 104 relative to the machine tool 106. The offset foot 120 is rotatable to two or more positions to accommodate use of the drilling apparatus 104 on a first side of structure of the workpiece 102 and a second side of the structure of the workpiece 102. Alternatively, work on the first side of the structure or the second side of the structure is accommodated by rotation, positioning, or both, of the tool arm 130 of the machine tool 106, the workpiece 102, or both.

A sensor interface 132 of the attachment box 114 may be coupled to a corresponding sensor interface 134 of the machine tool 106 when the drilling apparatus 104 is coupled to the machine tool 106. The sensor interfaces 132, 134 may be quick release interfaces. The sensor interfaces 132, 134 complete a load cell that enables the controller 108 of the machine tool 106 to receive sensor signals that correspond to a force applied to the workpiece 102 by the machine tool 106 at a contact tip 136 of the offset foot 120. In addition, the sensor interfaces 132, 134, or other electrical connections between the drilling apparatus 104 and the machine tool 106, enable other sensor signals to be provided to the controller 108. The other sensor signals may include a signal corresponding to an applied torque between the workpiece 102 and the contact tip 136 of the offset foot 120, identification signals of the tool 112 coupled to the tool interface 126 of the shaft 110, position signals associated with an orientation of the offset foot 120, location signals from a touch probe coupled as the tool 112 to the tool interface 126 of the shaft 110, other sensor signals, or combinations thereof.

The attachment box 114 may be releasably attached to the machine tool 106 by releasable latches of the machine tool 106 that engage latch mounts on a body of the attachment box 114 to secure the drilling apparatus 104 to the machine tool 106. In addition, when the attachment box 114 is coupled to the machine tool 106, the end effector interface 302 of the shaft 110 is configured to be coupled to a particular end effector of end effectors 122 of the machine tool 106. For example, when the drilling apparatus 104 is to be used to drill a hole in the workpiece 102, the end effector interface 302 is coupled to the spindle of the drill mechanism 124 of the end effectors 122 to enable the shaft 110 to rotate and move toward, or away from, the workpiece 102.

The drilling system 100 may include one or more systems configured to prevent damage due to contact of a leg of the drilling apparatus 104 with an obstruction when the machine tool 106 moves the drilling apparatus 104 from a first location to a second location or during positioning of the drilling apparatus relative to the workpiece 102 via the tool arm 130. The leg of the drilling apparatus 104 includes the extension tube 116, the bearing housing 118, and the offset foot 120.

In an implementation, the one or more systems include a camera system that provides image data of a work area associated with the machine tool 106 from two or more different perspectives to the controller 108. The controller 108 analyzes the image data and stops, or prevents, motion of the machine tool 106 when a person is in the work area, when a portion of the machine tool 106 or the drilling apparatus 104 is within a threshold distance of an object and continued motion of the machine tool 106 or the drilling apparatus 104 along a motion path would result in contact with the object, when other conditions are met, or combinations thereof.

Alternatively or in addition, the attachment box 114 can include a detection system. In an implementation, the attachment box 114 includes a spring system 500 (shown in FIG. 5) to enable detection of external lateral forces that exceed a threshold force applied to the leg of the drilling apparatus 104. When the machine tool 106 is used to move the drilling apparatus 104 from a first location to a second location, the shaft 110 is released from an end effector 122. Releasing the shaft 110 from the end effector 122 enables the first end of the shaft 110 to move should a lateral force be applied to the leg of the drilling apparatus 104. Lateral forces could be applied to the leg from an object (e.g., a person, a portion of the workpiece 102, a support structure for the workpiece 102, or other structure) when the machine tool 106 is moving the drilling apparatus 104 from a first location to another location.

Figure 5:
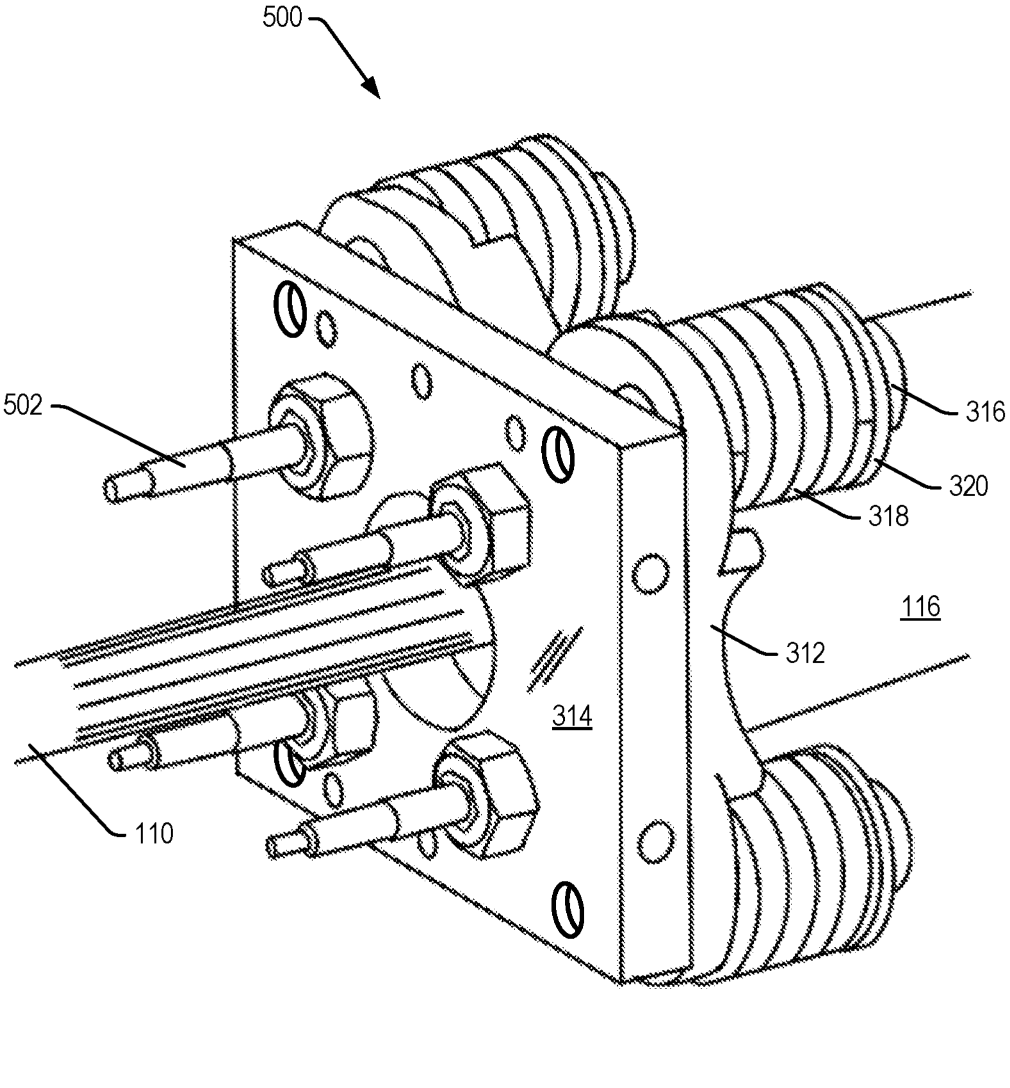
FIG. 5 is a perspective view of a portion of the drilling apparatus of FIG. 3.

As depicted in FIG. 3 and in FIG. 5, the extension tube 116 includes a flange 312 at a first end of the extension tube 116. The flange 312 is coupled to a plate 314 of the attachment box 114 by a plurality of spring and shoulder screw combinations (e.g., four spring and shoulder screw combinations). Each spring and shoulder screw combination includes a shoulder screw 316 with a threaded end that is threaded into the plate 314, a spring 318, and at least one end washer 320. The spring system 500 includes the flange 312, the plate 314, and the spring and shoulder screw combinations 316, 318, 320. The spring 318 of a spring and shoulder screw combination is a coil spring, a stack of appropriately oriented Belleville washers, or another type of biasing member. Strength of the springs 318 are selected to withstand a weight of the leg without sagging. A plurality of contact sensors 502 (e.g., four contact sensors as depicted in FIG. 5) are coupled to the plate 314 and ends of the contact sensors 502 extend through the plate 314. When no external lateral force is applied to the leg, the springs 318 apply force to the flange 312 that presses the flange 312 against the ends of the contact sensors 502.

When an external lateral force is applied to the leg, a portion of the flange 312 presses against the plate 314 near one or more of the spring and bolt combinations and another portion of the flange 312 applies compressive force to the spring(s) 318 of one or more of the other spring and bolt combinations. If the compressive force is sufficiently large, a portion of the flange 312 will separate from the plate 314 and cause one or more of the contact sensors 502 to send an interrupt signal to the controller 108 of the machine tool 106 (shown in FIG. 1). In response to the interrupt signal, the controller 108 sends one or more control signals to components of the machine tool 106 that stop movement of the machine tool 106, movement of the tool arm 130 of the machine tool 106, or both, and provide an alert signal to an operator. The strengths of the springs 318 are selected so that the interrupt signal is provided when at least an activation force is applied near an end of the offset foot 120. The activation force may be 50 pounds force or some other amount of force near the end of the offset foot 120.

The extension tube 116 includes the flange 312 at a first end and is coupled (e.g., welded or otherwise connected) to the bearing housing 118 at a second end. The extension tube 116 is used to set an offset length associated with the drilling apparatus 104. The offset length may be a longest orthogonal component of a distance from an end of the contact tip 136 of the offset foot 120 to a near edge of the attachment box 114. The offset length may be chosen based on a structure of a workpiece 102. As non-limiting examples, if a largest orthogonal distance from a start location of a hole near structure of the workpiece 102 to a top of the structure is 24 inches, the offset length may be 24.5 inches; if a largest orthogonal distance from a start location of a hole near structure of the workpiece 102 to a top of the structure is 16 inches, the offset length may be 16.5 inches; and if a largest orthogonal distance from a start location of a hole near structure of the workpiece 102 to a top of the structure is 14 inches, the offset length may be 14.3 inches. In other implementations, other offset distances may be implemented by use of an appropriately sized extension tube 116.

The bearing housing 118 includes a pair of spaced apart bearings 138. The bearings 138 may be located near ends of the bearing housing 118. In some implementations, the bearings 138 are fluid bearings that support the shaft 110. In an implementation, the bearing housing 118 includes a pair of three inch long bearings 138 that abut ends of the bearing housing 118. Each bearing 138 includes a helical channel. A particular fluid line of fluid lines 140 supported by the offset foot 120 and coupled to fluid lines 142 of a fluid system 144 of the machine tool 106 supply lubrication fluid through a connector to a helical channel of a bearing 138.

The offset foot 120 is coupled to the bearing housing 118 by one or more connectors. The offset foot 120 includes the contact tip 136 extending from a first end of the offset foot 120. The offset foot 120 houses a vacuum line 146 that aligns with a vacuum port of the contact tip 136. The vacuum line 146 extends to a second end of the offset foot 120. At the second end of the offset foot 120, the vacuum line 146 is configured to couple to a flexible vacuum hose 148 of a vacuum system 150 of the machine tool 106. Cuttings produced during drilling of a hole are removed through the vacuum port in the contact tip 136 by a vacuum produced by the vacuum system 150.

The offset foot 120 supports a plurality of fluid lines 140. One or more of the fluid lines 140 are used to supply lubricating fluid to the bearings 138. Also, one or more of the fluid lines 140 may be used to supply a lubricating fluid, air, or both, through a plurality of fluid ports in the contact tip 136 to spray a mist of lubricating fluid on the tool 112 during formation of the hole to cool the tool 112 and facilitate removal of the cuttings.

The offset foot 120 may also support one or more sensors. The sensors may include an RFID sensor 152 configured to read an RFID chip 129 coupled to the tool 112, to write to the RFID chip 129, or both. When the tool 112 is a drill bit, the controller 108 may write to the RFID chip 129 via the RFID sensor 152 to increase an indicator of the number of uses of the tool 112 after each use of the tool 112 to form a hole.

The one or more sensors may also include one or more position sensors 154 configured to indicate an orientation of the offset foot 120 when the offset foot 120 is rotatable relative to the bearing housing 118 to accommodate operation of the drilling apparatus 104 on different sides of workpiece structure extending from a surface of the workpiece 102. In a particular implementation, the position sensors 154 provide one or more signals to the controller 108 that indicate whether the offset foot 120 is positioned for left side of structure drilling, right side of structure drilling, or center drilling.

In implementations where the offset foot 120 is rotatable about a longitudinal axis of the bearing housing 118, the offset foot 120 may include a spring connector 156 or other connection system that enables the offset foot 120 to be set at a particular orientation relative to the bearing housing 118. The spring connector 156 includes a spring in a body of the spring connector 156 that applies a force to a pin. The spring biases an end of the pin towards the bearing housing 118 when a grip of the spring connector is released. The end of the pin fits in an opening of the bearing housing 118 to lock the offset foot 120 in a particular orientation relative to the offset foot 120. When a different orientation is desired, the grip of the spring connector 156 is pulled to withdraw the pin from the opening, the offset foot 120 is rotated towards the desired orientation, the grip is released, and the offset foot 120 is further rotated towards the desired orientation until the spring pushes the pin into a second opening associated with the desired location. In other implementations, the offset foot 120 is not rotatable relative to the bearing housing 118.

The contact tip 136 of the offset foot 120 includes the vacuum port and the plurality of fluid ports. The contact tip 136 includes a contact end that contacts a flat surface of the workpiece 102 to provide a large contact area between the contact end and the workpiece 102 to enable formation of holes normal to the flat surface of the workpiece 102 without slippage of the contact end relative to the workpiece 102 during formation of the hole. In some implementations, an interface 158 may be coupled to the contact end to provide a large contact area between the contact surface of the interface 158 and the flat surface of the workpiece 102 to allow the formation of a hole at a particular angle (e.g., at an angle above 0 degrees to 5 degrees) off of normal relative to the flat surface of the workpiece 102.

The machine tool 106 controls positioning and operation of a device (e.g., the drilling apparatus 104) coupled to the machine tool 106. In the implementation depicted in FIG. 1, the machine tool 106 is a robot that includes the controller 108, a position drive 160, the tool arm 130 with one or more end effectors 122, a tool arm drive 162, the fluid system 144, and the vacuum system 150. In other implementations, the machine tool 106 includes fewer components or additional components. For example, the machine tool 106 does not include a position drive 160 if the machine tool 106 is not configured to move from a fixed position.

The controller 108 of the machine tool 106 is a computer system that provides control signals to components of the machine tool 106 to control operation of the machine tool 106. Use of the machine tool 106 may be manually controlled via the controller 108 based on user input or may be automatically controlled by the controller 108 based on sensor data received by the controller 108.

The machine tool 106 may include the position drive 160. The position drive 160 moves the machine tool 106 from one location to another location so that the machine tool 106 is positioned in working relation to a stationary workpiece 102 based on command signals received from the controller 108. For example, the machine tool 106 may be mounted to track rails, and the position drive 160 receives command signals from the controller 108 to position the machine tool 106 at a particular location along the track rails relative to the workpiece 102. In other implementations, the machine tool 106 may be stationary, and a workpiece 102 may be moved to a particular position in working relation to the machine tool 106.

The machine tool 106 may also include the tool arm 130 and the tool arm drive 162. The tool arm drive 162 is configured to provide rotational positioning, location positioning, or both to a device (e.g., the drilling apparatus 104) coupled to the tool arm 130 based on command signals received from the controller 108. End effectors 122 of the tool arm 130 that are coupled to the device perform tasks on a workpiece 102 that is positioned in working relation to the machine tool 106 based on command signals received from the controller 108.

The machine tool 106 includes one or more systems that facilitate performance of tasks by the machine tool 106. For example, the machine tool 106 may include the fluid system 144 to provide fluid (e.g., a liquid or a gas) to a device (e.g., the drilling apparatus 104) via the one or more fluid lines 142, the vacuum system 150 to provide a vacuum via the vacuum hose 148 to a location near the workpiece 102, an electrical connection system 164 that includes sensor interfaces 134 to couple the controller 108 to the device in order for the controller 108 to receive sensor data from the device, and other systems. The fluid system 144 may include one or more pumps 166, pressure regulators, or other devices that control characteristics (e.g., temperature, pressure, quantity, etc.) of fluid provided to the device.

Figure 6:
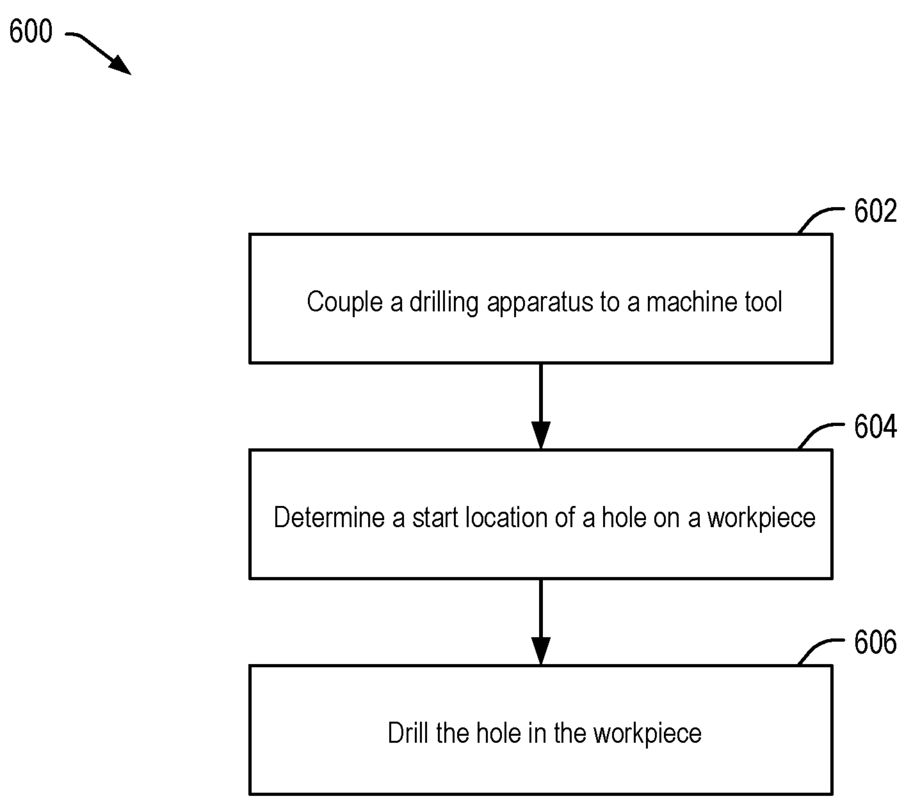
FIG. 6 depicts a flowchart of a process of forming a hole in a workpiece using a drilling apparatus.

FIG. 6 depicts a flowchart of an implementation of a process 600 of forming a hole in a workpiece using a drilling apparatus that enables formation of a close tolerance hole in a workpiece with restricted access to a start location of the hole, a large offset distance from the start location of the hole to an interface to a drive for the drilling apparatus, or both. The drilling apparatus may be the drilling apparatus 104 depicted in FIGS. 1-3 and the drive for the drilling apparatus may be the machine tool 106 depicted in FIG. 1 and FIG. 2.

The process 600, at block 602, includes coupling the drilling apparatus 104 to the machine tool 106. Coupling the drilling apparatus 104 to the machine tool 1-6 may include moving positioning slots 308 of an attachment box 114 onto mounts of a tool arm 130 of the machine tool 106. The drilling apparatus 104 may be secured to the tool arm 130 by locking latches of the tool arm 130 to latch mounts of the attachment box 114. A vacuum hose 148 of the machine tool 106 may be coupled to a vacuum line 146 of the drilling apparatus 104 and appropriate fluid lines 142 of the machine tool 106 may be coupled to corresponding fluid lines 140 of the drilling apparatus 104. Also, sensor interfaces 132 of the drilling apparatus 104 may be coupled to corresponding sensor interfaces of the machine tool 106.

The process 600 may include, at block 604, determining a start location of a hole on a workpiece 102. To determine the start location of the hole, the drilling apparatus 104 is moved by the machine tool 106 to a position in working relation to the workpiece 102 using a position drive 160, a tool arm drive 162, or both. The end effector interface 302 of the shaft 110 may be coupled to a particular effector of the end effectors 122 associated with use of a touch probe, and a touch probe may be attached as the tool 112 to the tool interface 126 of the shaft 110.

The machine tool 106 may move the touch probe using the tool arm 130 and the particular effector to determine coordinate locations relative to the machine tool 106 of one or more surface features of the workpiece 102. In some implementations, a surface feature of the one or more surface features is a start hole at a location of the workpiece 102 where the hole is to be drilled. The start hole may have a smaller diameter than the hole to be drilled by the drilling apparatus 104. In other implementations, the one or more surface features include offset holes or other surface features of the workpiece 102 or a structure coupled to the workpiece. Based on locations of the one or more surface features determined by use of the touch probe, the controller 108 determines a coordinate location of the start hole and determines a contact location to position the contact tip 136 of the drilling apparatus 104 so that a center of the shaft 110 aligns with the coordinate location. After determining the locations of the one or more features, the drilling apparatus 104 is moved away from the workpiece 102 by the tool arm 130.

In some implementations, the touch probe is removed from the shaft 110 and a pen tool is coupled to the tool interface 126 as the tool 112. The machine tool 106 may move the drilling apparatus 104 and contact the contact tip 136 using the tool arm 130 to the workpiece 102 at the contact location. The machine tool 106 may utilize the particular effector to mark the start location of the hole with ink or paint from the pen tool. The position of the drilling apparatus 104 is inspected to make sure that the drilling apparatus 104 only contacts the workpiece 102 at the contact tip 136. The drilling apparatus 104 is moved away from the workpiece 102 by the tool arm 130 and the mark is visually inspected by an operator to determine if the start location is at a proper location. If the mark is not at the proper location, the mark is removed and the touch probe is used again to determine one or more surface features, the operator can manually adjust the coordinate location of the start of the hole, the pen tool can be used to make another mark, or combinations thereof, until the mark is determined to be in a proper location. When the operator determines that the mark is at the proper location, the machine tool 106 is used to move the drilling apparatus 104 away from the workpiece 102.

The process 600 may also include, at block 606, drilling the hole in the workpiece 102. To drill the hole in the workpiece 102, a drill bit is attached as the tool 112 to the tool interface 126 of the shaft 110 and the end effector interface 302 is coupled to the spindle of the drill mechanism 124 of the end effectors 122. The controller 108 sends command signals to return the contact tip 136 of the drilling apparatus 104 to the contact location. The controller 108 sends command signals to the machine tool to use the vacuum system 150 to draw a vacuum at a vacuum port of the contact tip 136 and sends command signals to the fluid system 144 to provide air and lubrication fluid to the fluid ports to supply a mist to the drill bit. The controller 108 also sends command signals to the machine tool to use the drill mechanism to form the hole in the workpiece.

Figure 7:
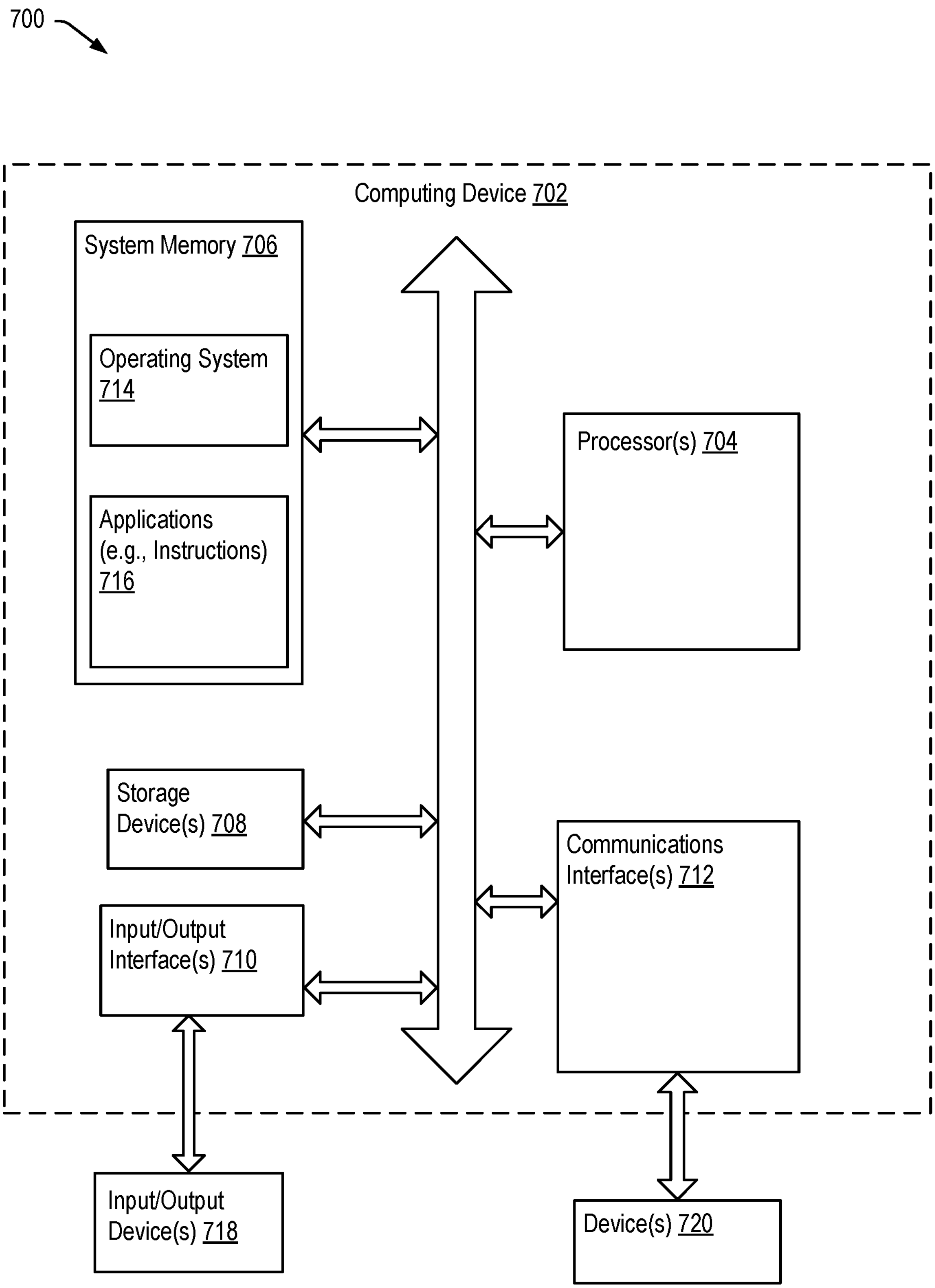
FIG. 7 is a diagram of a representation of a computing device.

FIG. 7 is an illustration of a block diagram of a computing environment 700 including a computing device 702 configured to support implementations of computer-implemented methods and computer-executable program instructions (or code) according to the present disclosure. For example, the computing device 702, or portions thereof, may execute instructions to perform, or cause equipment to perform, operations described with reference to FIGS. 1 and 6. In an implementation, the computing device 702 is, or is a component of, the controller 108 of the machine tool 106 of FIG. 1.

The computing device 702 includes one or more processors 704. The processor(s) 704 communicate with a system memory 706, one or more storage devices 708, one or more input/output interfaces 710, one or more communications interfaces 712, or a combination thereof. The system memory 706 includes non-transitory computer readable media, including volatile memory devices (e.g., random access memory (RAM) devices), nonvolatile memory devices (e.g., read-only memory (ROM) devices, programmable read-only memory, and flash memory), or both. The system memory 706 includes an operating system 714, which may include a basic input/output system for booting the computing device 702 as well as a full operating system to enable the computing device 702 to interact with users, other programs, and other devices. The system memory 706 includes one or more applications 716 (e.g., instructions) which are executable by the processor(s) 704.

The processor(s) 704 communicate with the one or more storage devices 708. For example, the one or more storage devices 708 are non-transitory computer readable media that can include nonvolatile storage devices, such as magnetic disks, optical disks, or flash memory devices. The storage devices 708 can include both removable and non-removable memory devices. The storage devices 708 can be configured to store an operating system, images of operating systems, applications, and program data. In particular implementations, the system memory 706, the storage devices 708, or both, include tangible computer-readable media incorporated in hardware and which are not signals.

The processor(s) 704 communicate with the one or more input/output interfaces 710 that enable the computing device 702 to communicate with one or more input/output devices 718 to facilitate user interaction. The input/output interfaces 710 can include serial interfaces (e.g., universal serial bus (USB) interfaces or Institute of Electrical and Electronics Engineers (IEEE) 1364 interfaces), parallel interfaces, display adapters, audio adapters, and other interfaces. The input/output devices 718 can include keyboards, pointing devices, displays (e.g., one or more monitors, one or more gauges, etc.), speakers, microphones, touch screens, rotatable selectors, levers, knobs, slides, switches, and other devices. The processor(s) 704 detect interaction events based on user input received via the input/output interfaces 710. Additionally, the processor(s) 704 send a display to a display device via the input/output interfaces 710.

The processor(s) 704 can communicate with one or more devices 720 via the one or more communications interfaces 712. The one or more devices 720 can include external computing devices contacted via a communication network and controllers, sensors, and other devices coupled to the computing device 702 via wired or wireless local connections. The one or more communications interfaces 712 may include wired Ethernet interfaces, IEEE 802 wireless interfaces, other wireless communication interfaces, one or more converters to convert analog signals to digital signals, electrical signals to optical signals, one or more converters to convert received optical signals to electrical signals, or other network interfaces.

Aspects of the disclosure are described further with reference to the following set of interrelated clauses:

According to Clause 1, a drilling apparatus to facilitate formation of a hole in a workpiece with workpiece structure that results in a large offset distance from a start location of the hole to a machine tool, restricted access to the start location of the hole, or both, includes: an attachment box configured to couple to a machine tool; a bearing housing coupled to the attachment box, wherein the bearing housing includes a pair of bearings; a shaft positioned through the bearing housing to couple to the bearings of the bearing housing, wherein the shaft includes an end effector interface configured to couple to one or more end effectors of the machine tool at a first end of the shaft, and wherein the shaft includes a tool interface configured to couple to a tool at a second end of the shaft; and an offset foot coupled to the bearing housing.

Clause 2 includes the drilling apparatus of Clause 1, and further includes an extension positioned between the attachment box and the bearing housing.

Clause 3 includes the drilling apparatus of Clause 1 or Clause 2, wherein the attachment box includes sensors and a spring system configured to detect deflection of the bearing housing relative to the attachment box.

Clause 4 includes the drilling apparatus of any of Clauses 1 to 3, wherein the machine tool is a robot and wherein the attachment box is coupled to a tool arm of the robot.

Clause 5 includes the drilling apparatus of any of Clauses 1 to 4, wherein the tool includes one of a drill bit, a touch probe, and a marking pen.

Clause 6 includes the drilling apparatus of any of Clauses 1 to 5, wherein the offset foot is configured to attach to a first fluid line to provide a lubricant to the bearings of the bearing housing during use.

Clause 7 includes the drilling apparatus of any of Clauses 1 to 6, wherein the tool comprises a drill bit, and wherein the offset foot is configured to couple to a vacuum hose that removes cuttings produced by the drill bit from the workpiece during use.

Clause 8 includes the drilling apparatus of any of Clauses 1 to 7, wherein the tool comprises a drill bit, and wherein the offset foot is configured to attach to one or more fluid lines to provide a mist of lubrication fluid to the drill bit during use of the drill bit to form a hole in the workpiece.

Clause 9 includes the drilling apparatus of any of Clauses 1 to 8, wherein the offset foot is rotatable about a longitudinal axis of the bearing housing, and wherein the offset foot is configured to lock in place at two or more distinct positions relative to the bearing housing.

Clause 10 includes the drilling apparatus of Clause 9, wherein the offset foot includes a position sensor to detect a position of the offset foot relative to the bearing housing.

According to Clause 11, a drilling system configured to facilitate formation of a hole in a workpiece with workpiece structure that results in a large offset distance from a start location of the hole to a machine tool, restricted access to the start location of the hole, or both, includes: an attachment box to couple to a machine tool; a bearing housing coupled to the attachment box, wherein the bearing housing includes a pair of bearings; a shaft positioned through the bearing housing to couple to the bearings, wherein the shaft is configured to couple to a drill mechanism of the machine tool at a first end; a drill bit configured to couple a second end of the shaft; and an offset foot coupled to the bearing housing, wherein a contact tip of the offset foot is configured to contact a workpiece during use.

Clause 12 includes the drilling system of Clause 11, and further includes a collar coupled to the drill bit, the collar including a radio frequency identifier (RFID) chip with data that identifies the drill bit.

Clause 13 includes the drilling system of Clause 12, wherein the offset foot further comprises a RFID sensor to provide an identifier of the drill bit received from the RFID chip to a controller of the machine tool.

Clause 14 includes the drilling system of any of Clause 11 to 13, and further includes an extension tube positioned between the attachment box and the bearing housing.

Clause 15 includes the drilling system of any of Clause 11 to 14, and further includes an interface configured to couple to the contact tip, wherein the interface enables formation of a hole in the workpiece at an angle relative to a normal direction of a surface of the workpiece contacted by the interface, and wherein the angle is greater than 0 degrees and less than five degrees.

According to Clause 16, a drill system configured to facilitate formation of a hole in a workpiece with workpiece structure that results in a large offset distance from a start location of the hole to a machine tool, restricted access to the start location of the hole, or both, includes: the machine tool; an attachment box configured to couple to the machine tool; a bearing housing coupled to the attachment box, wherein the bearing housing includes a pair of bearings; a shaft positioned through the bearing housing, wherein the shaft is configured to couple to a spindle of the machine tool at a first end of the shaft; a drill bit configured to couple to a second end of the shaft; and an offset foot coupled to the bearing housing, wherein a contact tip of the offset is configured to contact a workpiece during use.

Clause 17 includes the drilling system of Clause 16, and further includes a fluid pump to provide lubrication to the bearings of the bearing housing.

Clause 18 includes the drilling system of Clause 16 or Clause 17, and further includes a vacuum system coupled to the offset foot by a hose.

Clause 19 includes the drilling system of any of Clauses 16 to 18, wherein the attachment box includes sensors and a spring system configured to detect deflection of the bearing housing relative to the attachment box.

Clause 20 includes the drilling system of any of Clauses 16 to 19, wherein the offset foot is rotatable about a longitudinal axis of the bearing housing, and wherein the offset foot is configured to lock in place at two or more distinct positions relative to the bearing housing.

Clause 21 includes the drilling system of Clause 20, further including one or more position sensors to provide position data to the machine tool, wherein the position data indicates an orientation of the offset foot.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A drilling apparatus comprising:

an attachment box configured to couple to a machine tool, wherein the attachment box includes a plate;

a bearing housing that includes a pair of bearings;

an extension tube positioned between the attachment box and the bearing housing, the extension tube having a flange at a first end of the extension tube;

a plurality of spring and shoulder screw combinations that couple the flange to the plate;

a plurality of contact sensors coupled to the plate, wherein respective ends of the contact sensors extend through the plate;

a shaft positioned through the bearing housing to couple to the bearings of the bearing housing, wherein the shaft includes an end effector interface configured to couple to one or more end effectors of the machine tool at a first end of the shaft, and wherein the shaft includes a tool interface configured to couple to a tool at a second end of the shaft; and a foot coupled to the bearing housing.

2. The drilling apparatus of claim 1, wherein the plurality of spring and shoulder screw combinations comprises four spring and shoulder screw combinations.

3. The drilling apparatus of claim 1, wherein the contact sensors are configured to detect deflection of the bearing housing relative to the attachment box.

4. The drilling apparatus of claim 1, wherein the machine tool is a robot and wherein the attachment box is coupled to a tool arm of the robot.

5. The drilling apparatus of claim 1, wherein the tool includes one of a drill bit, a touch probe, and a pen tool.

6. The drilling apparatus of claim 1, wherein the foot is configured to attach to a first fluid line to provide a lubricant to the bearings of the bearing housing during use.

7. The drilling apparatus of claim 1, wherein the tool comprises a drill bit, and wherein the foot is configured to couple to a vacuum hose that removes cuttings produced by the drill bit from a workpiece during use.

8. The drilling apparatus of claim 1, wherein the tool comprises a drill bit, and wherein the foot is configured to attach to one or more fluid lines to provide a mist of lubrication fluid to the drill bit during use of the drill bit to form a hole in a workpiece.

9. The drilling apparatus of claim 1, wherein the foot is rotatable about a longitudinal axis of the bearing housing.

10. The drilling apparatus of claim 9, wherein the foot includes a position sensor to detect a position of the foot relative to the bearing housing.

11. A drilling system comprising:

an attachment box to couple to a machine tool, wherein the attachment box includes a plate;

a bearing housing that includes a pair of bearings;

an extension tube positioned between the attachment box and the bearing housing, the extension tube having a flange at a first end of the extension tube;

a plurality of spring and shoulder screw combinations that couple the flange to the plate;

a plurality of contact sensors coupled to the plate, wherein respective ends of the contact sensors extend through the plate;

a shaft positioned through the bearing housing to couple to the bearings, wherein the shaft is configured to couple to a drill mechanism of the machine tool at a first end of the shaft;

a drill bit configured to couple a second end of the shaft; and a foot coupled to the bearing housing, wherein a contact tip of the foot is configured to contact a workpiece during use.

12. The drilling system of claim 11, further comprising a collar coupled to the drill bit, the collar including a radio frequency identifier (RFID) chip with data that identifies the drill bit.

13. The drilling system of claim 12, wherein the foot further comprises a RFID sensor to provide an identifier of the drill bit received from the RFID chip to a controller of the machine tool.

14. The drilling system of claim 11, wherein the plurality of spring and shoulder screw combinations comprises four spring and shoulder screw combinations.

15. The drilling system of claim 11, further comprising an interface configured to couple to the contact tip, wherein the interface enables formation of a hole in the workpiece.

16. A drill system comprising:

a machine tool;

an attachment box configured to couple to the machine tool, wherein the attachment box includes a plate;

a bearing housing that includes a pair of bearings;

an extension tube positioned between the attachment box and the bearing housing, the extension tube having a flange at a first end of the extension tube;

a plurality of spring and shoulder screw combinations that couple the flange to the plate;

a plurality of contact sensors coupled to the plate, wherein respective ends of the contact sensors extend through the plate;

a shaft positioned through the bearing housing, wherein the shaft is configured to couple to a drill mechanism of the machine tool at a first end of the shaft;

a drill bit configured to couple to a second end of the shaft; and a foot coupled to the bearing housing, wherein a contact tip of the foot is configured to contact a workpiece during use.

17. The drill system of claim 16, further comprising a vacuum system coupled to the foot by a hose.

18. The drill system of claim 16, wherein the attachment box includes sensors and a spring system configured to detect deflection of the bearing housing relative to the attachment box.

19. The drill system of claim 16, wherein the foot is rotatable about a longitudinal axis of the bearing housing.

20. The drill system of claim 19, further comprising one or more position sensors to provide position data to the machine tool, wherein the position data indicates an orientation of the foot.

21. The drill system of claim 16, wherein a surface of the flange is flush with a surface of the plate, and wherein the surface of the plate is perpendicular to the extension tube.

* * * * *